United States Patent
Takahashi

(10) Patent No.: US 7,923,950 B2
(45) Date of Patent: Apr. 12, 2011

(54) VEHICLE DRIVE DEVICE AND METHOD OF CONTROLLING VEHICLE DRIVE DEVICE

(75) Inventor: Hidenori Takahashi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 114 days.

(21) Appl. No.: 12/223,403

(22) PCT Filed: Jan. 23, 2007

(86) PCT No.: PCT/JP2007/051340
§ 371 (c)(1),
(2), (4) Date: Jul. 30, 2008

(87) PCT Pub. No.: WO2007/099726
PCT Pub. Date: Sep. 7, 2007

(65) Prior Publication Data
US 2009/0026987 A1 Jan. 29, 2009

(30) Foreign Application Priority Data

Feb. 28, 2006 (JP) ................................ 2006-052845

(51) Int. Cl.
*H02P 3/14* (2006.01)
*H02P 3/18* (2006.01)
(52) U.S. Cl. ........................... 318/376; 318/139; 318/56
(58) Field of Classification Search .................. 318/376, 318/139, 56
See application file for complete search history.

(56) References Cited

U.S. PATENT DOCUMENTS

| 5,839,800 | A | 11/1998 | Koga et al. |
| 6,897,629 | B2 * | 5/2005 | Wilton et al. ................. 318/139 |
| 2004/0245947 | A1 | 12/2004 | Wilton et al. |
| 2007/0274109 | A1 | 11/2007 | Oyobe et al. |

FOREIGN PATENT DOCUMENTS

| CN | 1193214 A | 9/1998 |
| JP | A-2-41603 | 2/1990 |
| JP | A-8-79911 | 3/1996 |
| JP | A-8-140203 | 5/1996 |
| JP | A-8-163707 | 6/1996 |
| JP | A-9-74605 | 3/1997 |
| JP | A-2002-95105 | 3/2002 |
| JP | A-2002-337573 | 11/2002 |
| JP | A-2005-269705 | 9/2005 |
| JP | A-2005-318731 | 11/2005 |

OTHER PUBLICATIONS

Jul. 16, 2010 Notice of Allowance for Korean Patent Application No. 10-2008-7023515 (with translation).
Nov. 17, 2010 Office Action in Chinese Patent Application No. 200780007000.2 (with translation).

* cited by examiner

*Primary Examiner* — Bentsu Ro
*Assistant Examiner* — Erick Glass
(74) *Attorney, Agent, or Firm* — Oliff & Berridge, PLC

(57) ABSTRACT

A vehicle drive device includes an engine (200), a motor generator (MG1) driven by the engine (200) and generating power, a motor generator (MG2) driving the vehicle and generating electric power at the time of regenerative braking, a battery (B) capable of exchanging power to/from the motor generators (MG1, MG2), a temperature sensor (10) detecting temperature of the battery (B), and a controller (30) controlling the motor generators (MG1, MG2). If reduction in a required driving torque value of the motor generator (MG2) is detected, the controller changes start timing of regenerative braking by the motor generator (MG2) dependent on an output of the temperature sensor (10).

4 Claims, 4 Drawing Sheets

[ACCELERATOR ON]

[ACCELERATOR OFF
Tbat≧T1]

VEHICLE DRIVE DEVICE AND METHOD OF CONTROLLING VEHICLE DRIVE DEVICE

TECHNICAL FIELD

The present invention relates to a vehicle drive device and, specifically, to a vehicle drive device used for a hybrid vehicle that drives a vehicle using both an internal combustion engine and a rotating electric machine.

BACKGROUND ART

Recently, electric vehicles, hybrid vehicles and fuel cell vehicles that mount an electric storage and mount a motor as a driving device have been attracting attention as environmentally friendly vehicles. In such vehicles, regenerative braking, in which kinetic energy is converted by a motor to electric energy and returned to a battery when the brake is applied to the vehicle, is positively adopted to improve energy efficiency.

Among such vehicles, a hybrid vehicle is provided with a generator driven by an engine, in order to make up for the shortcomings of an electric vehicle that a large capacity battery is necessary to attain long running distance so that the vehicle becomes heavy and charging takes long time.

In regenerative braking, however, it is possible that the regenerated electric power and the electric power generated by the generator are both applied across the battery terminals and, dependent on the state of charge of the battery, the voltage across the terminals could increase past the tolerable voltage. If an excessive voltage should be applied across the terminals, electrolyte in the battery might possibly decompose, or gas or heat could be generated, making shorter the battery life.

Japanese Patent Laying-Open No. 8-79911 discloses a hybrid-type electric vehicle solving such a problem, in which application of excessive voltage across the terminal at the time of regenerative braking can be prevented.

Battery life much depends on battery temperature. The heat generated in the battery is given by $I^2R$, where I represents battery current and R represents internal resistance. If an excessive current flows even for a short period of time, the heat builds up in proportion to the square of the current. Therefore, not only from the viewpoint of state of charge but also from the viewpoint of battery temperature, it is necessary to regulate the electric power derived from regenerative braking and the electric power generated by the generator not to be applied at one time across the battery terminals. Specifically, consideration is necessary even if the state of charge is low, to prevent instantaneous peak of charging current from attaining excessively high.

On the other hand, it is not the case that the lower the battery temperature, the better. There is an optimal temperature range for use. Therefore, the hybrid vehicle disclosed in Japanese Patent Laying-Open No. 8-79911 still has a room for improvement.

An object of the present invention is to provide a vehicle drive device attaining improved energy efficiency while protecting the electric storage.

DISCLOSURE OF THE INVENTION

In summary, the present invention provides a vehicle drive device, including: a first rotating electric machine driving the vehicle and generating electric power at the time of regenerative braking; an electric storage capable of exchanging electric power to/from the first rotating electric machine; a temperature detecting unit detecting temperature of the electric storage; and a controller controlling the first rotating electric machine. If reduction in required driving torque value of the first rotating electric machine is detected, the controller switches whether regenerative braking by the first rotating electric machine is to be performed or not, dependent on an output of the temperature detecting unit.

Preferably, if the temperature of the electric storage unit exceeds a prescribed value, the controller inhibits regenerative braking by the first rotating electric machine in a prescribed time period after detection of reduction in the required value.

Preferably, if the temperature of the electric storage unit is below a prescribed value, the controller permits regenerative braking by the first rotating electric machine in a prescribed time period after detection of reduction in the required value.

Preferably, the vehicle drive device further includes a brake device applying braking force to the vehicle. If the temperature of the electric storage unit exceeds a prescribed value, the controller inhibits regenerative braking by the first rotating electric machine for a prescribed time period, and braking force is applied to the vehicle by the brake device in the prescribed time period.

Preferably, the controller recognizes the required driving torque value from an output of an accelerator sensor detecting a position of an accelerator pedal.

Preferably, the vehicle drive device further includes: an internal combustion engine; and a second rotating electric machine driven by the internal combustion engine and generating electric power. The electric storage is capable of exchanging electric power to/from the first and second rotating electric machines. The controller controls the first and second rotating electric machines.

According to another aspect, the present invention provides a vehicle drive device, including: a first rotating electric machine driving the vehicle and generating electric power at the time of regenerative braking; an electric storage capable of exchanging electric power to/from the first rotating electric machine; a temperature detecting unit detecting temperature of the electric storage; and a controller controlling the first rotating electric machine. If reduction in required driving torque value of the first rotating electric machine is detected, the controller changes start timing of regenerative braking by the first rotating electric machine, dependent on an output of the temperature detecting unit.

Preferably, vehicle drive device further includes a brake device applying braking force to the vehicle. If the temperature of the electric storage unit exceeds a prescribed value, the controller delays by a prescribed time period the start timing of regenerative braking by the first rotating electric machine, and braking force is applied to the vehicle by the brake device in the prescribed time period.

Preferably, the controller recognizes the required driving torque value from an output of an accelerator sensor detecting a position of an accelerator pedal.

Preferably, the vehicle drive device further includes: an internal combustion engine; and a second rotating electric machine driven by the internal combustion engine and generating electric power. The electric storage is capable of exchanging electric power to/from the first and second rotating electric machines. The controller controls the first and second rotating electric machines.

According to a still further aspect, the present invention provides a method of driving a vehicle drive device including a first rotating electric machine driving the vehicle and generating electric power at the time of regenerative braking, an electric storage capable of exchanging electric power to/from the first rotating electric machine, and a temperature detecting unit detecting temperature of the electric storage, the method including the steps of: detecting reduction of a required driving torque value of the first rotating electric machine; and switching whether regenerative braking by the first rotating electric machine is to be performed or not, dependent on an output from the temperature detecting unit.

The present invention protects the electric storage of a vehicle and improves energy efficiency.

BEST MODES FOR CARRYING OUT THE INVENTION

Figure 1:
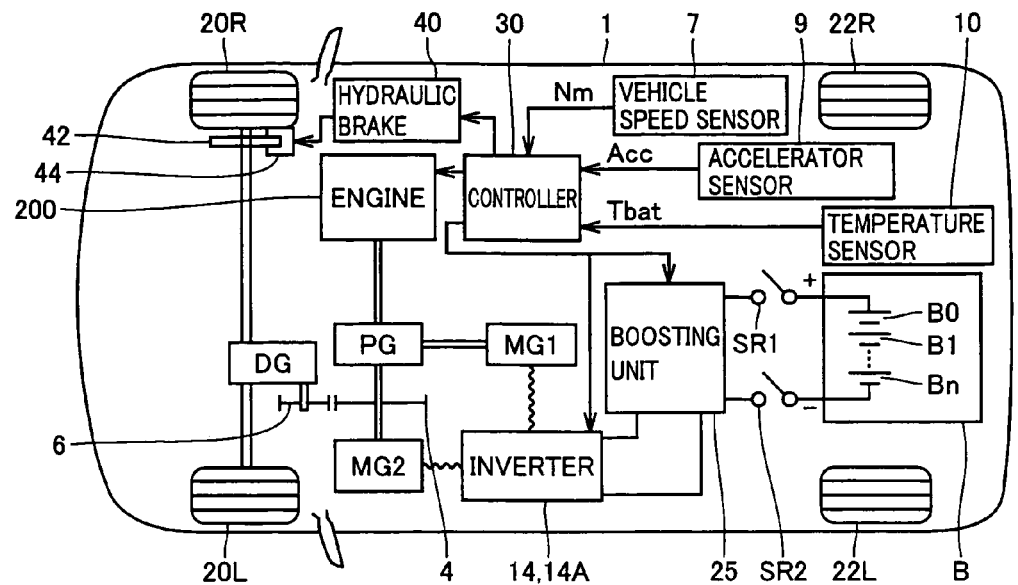
FIG. 1 is a block diagram showing a structure of a hybrid vehicle 1 in accordance with an embodiment of the present invention.

In the following, an embodiment of the present invention will be described with reference to the figures. In the figures, the same or corresponding portions will be denoted by the same reference characters, and description thereof will not be repeated.

FIG. 1 is a block diagram showing a structure of a hybrid vehicle 1 in accordance with an embodiment of the present invention.

Referring to FIG. 1, hybrid vehicle 1 includes front wheels 20R and 20L, rear wheels 22R and 22L, an engine 200, a planetary gear PG, a differential gear DG, and gears 4 and 6.

Hybrid vehicle 1 further includes a battery B, a boosting unit 25 for boosting DC power output from battery B, and inverters 14 and 14A exchanging the DC power to/from boosting unit 25.

Hybrid vehicle 1 further includes a motor generator MG1 receiving power from engine 200 through planetary gear PG and generating electric power, and a motor generator MG2 having its rotation shaft connected to planetary gear PG. Inverters 14 and 14A are connected to motor generators MG1 and MG2, respectively, and convert AC power and DC power from the boosting circuit.

The planetary gear PG includes a sun gear, a ring gear, a pinion gear that meshes with the sun and ring gears, and a planetary carrier supporting the pinion gear rotatable about the sun gear. Planetary gear PG has first to third rotation shafts. The first rotation shat is a rotation shaft of planetary carrier connected to engine 200. The second rotation shaft is a rotation shaft of sun gear connected to motor generator MG1. The third rotation shaft is a rotation shaft of ring gear connected to motor generator MG2.

A gear 4 is attached to the third rotation shaft, and gear 4 drives gear 6, whereby power is transmitted to differential gear DG. Differential gear DG transmits the power received from gear 6 to front wheels 20R and 20L, and transmits rotational force of front wheels 20R and 20L to the third rotation shaft of planetary gear PG through gears 6 and 4.

Planetary gear PG serves to split the power among engine 200 and motor generators MG1 and MG2. Specifically, if rotations of two of the three rotation shafts of planetary gear PG are determined, rotation of the remaining one rotation shaft is naturally determined. In this manner, engine 200 is operated in a most efficient range while motor generator MG2 is driven with the amount of power generation by motor generator MG1 controlled, whereby a vehicle of good energy efficiency as a whole is realized.

Battery B as a DC power source is a secondary battery such as a nickel hydride or lithium ion battery, which supplies DC power to boosting unit 25 and is charged with DC power from boosting unit 25.

Battery B is a battery assembly including a plurality of battery units B0 to Bn connected in series. Between boosting unit 25 and battery B, system main relays SR1 and SR2 are provided, and the high voltage is shut off when the vehicle is not in operation.

Boosting unit 25 boosts the DC voltage received from battery B, and supplies the boosted DC voltage to inverters 14 and 14A. Inverters 14 and 14A convert the supplied DC voltage to AC voltage, and when the engine starts, control driving of motor generator MG1. Further, after the engine started, the AC power generated by motor generator MG1 is converted to DC by inverters 14 and 14A, and further converted to appropriate voltage for charging battery B by boosting unit 25, and thus, the battery B is charged.

Hybrid vehicle 1 further includes an accelerator sensor 9 detecting a position of an accelerator pedal as an input unit receiving an acceleration request instruction from the driver, a temperature sensor 10 attached to battery B, and a controller 30 controlling engine 200, inverters 14 and 14A, and boosting unit 25, in accordance with an accelerator position Acc from accelerator sensor 9 and a temperature Tbat detected by temperature sensor 10. Temperature sensor 10 detects battery temperature Tbat and transmits it to controller 30.

When the accelerator pedal is stepped, inverters 14 and 14A drive motor generator MG2 in accordance with an instruction from controller 30. Motor generator MG2 assists engine 200 to drive front wheels 20R and 20L.

At the time of braking, controller 30 causes co-operation of a hydraulic brake device 40, a brake caliper 44 and a brake disk 42 constituting a mechanical brake, and motor generator MG2, for braking. Motor generator MG2 performs a regenerative operation, and converts rotational kinetic energy of the wheels to electric energy. The obtained electric energy is returned through inverters 14 and 14A and boosting unit 25 to battery B.

Controller 30 determines the ratio of use between the regenerative brake and the mechanical brake, based on the state of charge (SOC) and the temperature of battery B.

Regenerative control at the time of braking includes braking with power regeneration that occurs when the driver driving the hybrid vehicle operates the foot brake. Further, regenerative control also involves situations where the driver does not operate the foot brake but the speed of the vehicle is decelerated or acceleration is stopped by not stepping the accelerator pedal during running, while regenerating power.

Figure 2:
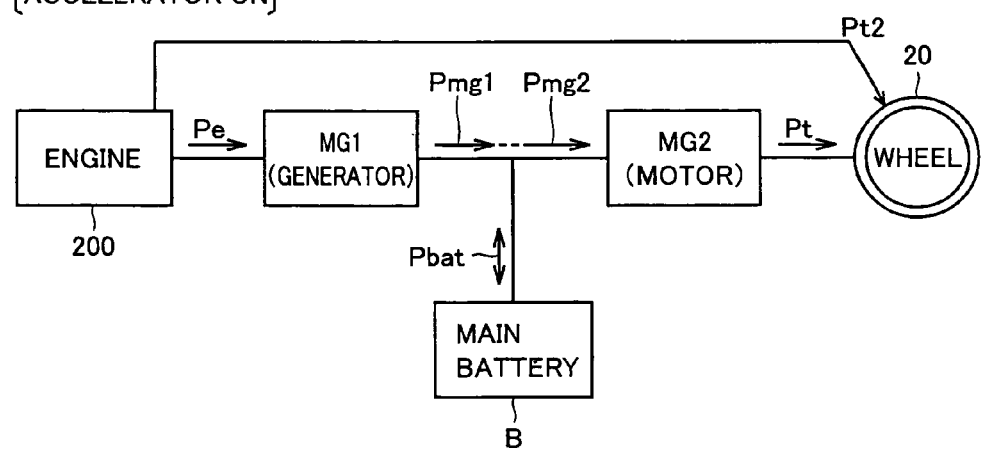
FIG. 2 is a schematic diagram illustrating energy flow when the vehicle is accelerated or the vehicle is running at a constant speed.

FIG. 2 is a schematic diagram illustrating energy flow when the vehicle is accelerated or the vehicle is running at a constant speed.

That the vehicle is accelerated or running at a constant speed means the driver is stepping on the accelerator pedal. As shown in FIG. 2, rotational kinetic energy Pe obtained by fuel combustion by engine 200 rotates motor generator MG1, and motor generator MG1 as a generator outputs electric power Pmg1. At this time, motor generator MG2 applies rotational kinetic energy Pt to the wheels. Further, there is also rotational kinetic energy Pt2 that is directly transmitted from engine 200 to the wheels through the planetary gear as the power split device. Rotational kinetic energies Pt and Pt2 are used for acceleration of the vehicle or to counter air resistance or friction resistance during running.

Let us represent the electric power generated by motor generator MG1 by Pmg1 and the electric power consumed by motor generator MG2 by Pmg2. The electric power Pbat charged/discharged by the main battery is the difference between powers Pmg1 and Pmg2 and it is not very large.

In such a situation, assume that the accelerator pedal is released and the vehicle enters an accelerator-off state or a state with foot brake on. Then, power consumption by motor generator MG2 stops, as acceleration is stopped. On the other hand, power generation by motor generator MG1 is not abruptly stopped. Therefore, electric power Pmg1 charges battery B. If motor generator MG2 performs regenerative braking here, it follows that the regenerated power also charges battery B. As the current increases, heat builds up in the battery, in proportion to the square of the current. Here, it is desirable to recover the regenerated power to the battery with highest possible efficiency, while preventing adverse effect of the heat generated in the battery.

Figure 3:
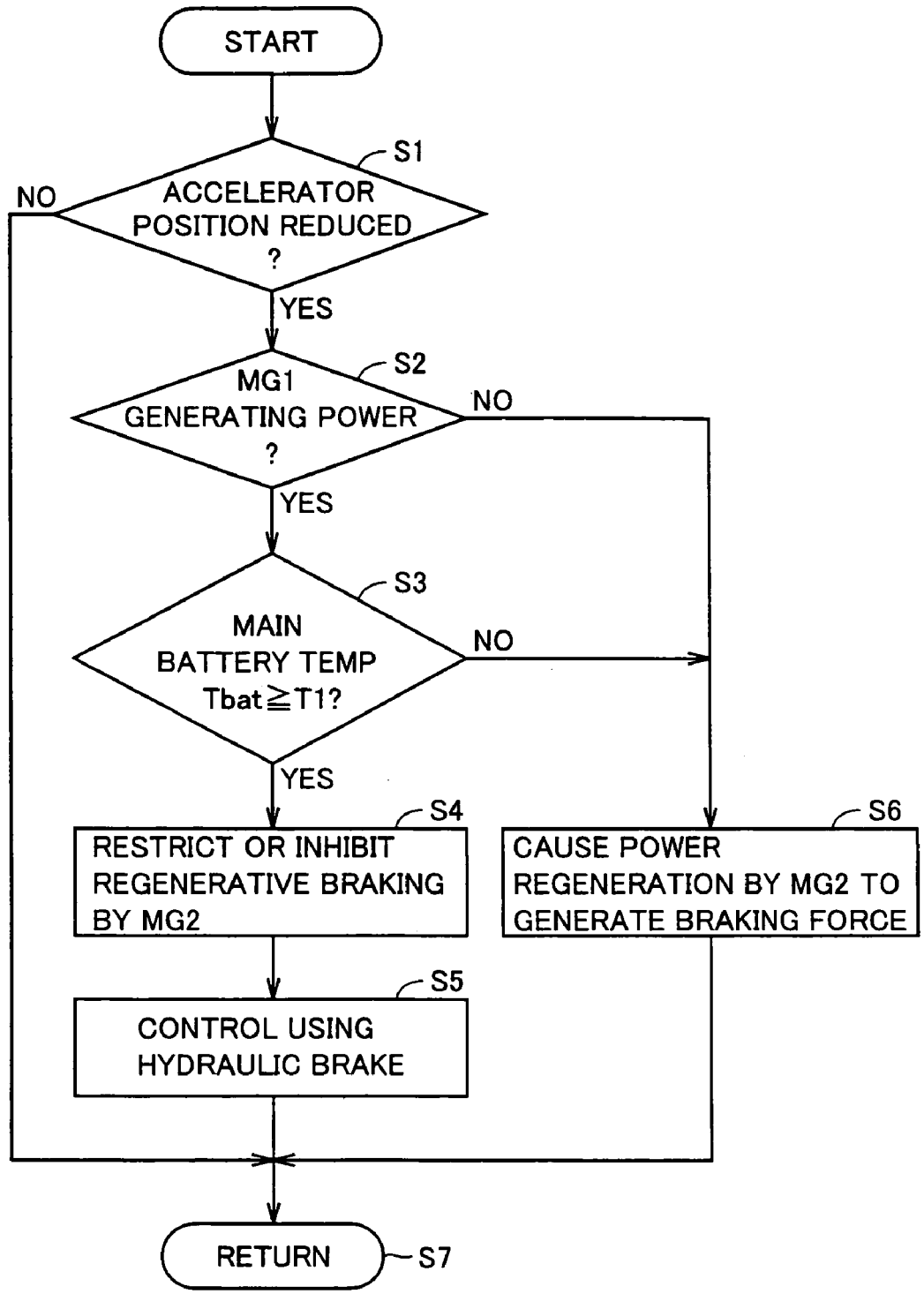
FIG. 3 is a flowchart showing a control structure of a program related to braking of the vehicle executed by a controller 30 shown in FIG. 1.

FIG. 3 is a flowchart showing a control structure of a program related to braking of the vehicle executed by a controller 30 shown in FIG. 1. The process of the flowchart is called from a prescribed main routine and executed at every prescribed time interval or every time prescribed conditions are satisfied.

Referring to FIGS. 1 and 3, at step S1, controller 30 monitors an output of accelerator sensor 9 and determines whether accelerator position decreases or not. If reduction in accelerator position is not detected, the energy balance shown in FIG. 2 is maintained and, therefore, the process proceeds to step S7 and the control returns to the main routine.

If reduction in accelerator position is detected at step S1, the process proceeds to step S2. Here, power consumption at motor generator MG2 is stopped and, therefore, controller 30 determines whether or not motor generator MG1 is generating electric power. Specifically, a hybrid vehicle is capable of EV running in which the engine is stopped and the vehicle runs only by the motor as an electric vehicle. In EV running mode, motor generator MG1 does not generate electric power.

At step S2, if motor generator MG1 is generating power, the process proceeds to step S3, and if motor generator MG1 is not generating power, the process proceeds to step S6.

At step S3, controller 3 determines whether the battery temperature detected by temperature sensor 10 is equal to or higher than a specified temperature T1. The specified temperature T1 corresponds to a temperature at which input/output is restricted to protect battery B, or the temperature at which cooling is started by a cooling fan or the like, not shown.

If the main battery temperature Tbat is equal to or higher than the specified temperature T1 at step S3, the process proceeds to step S4, and if the main battery temperature Tbat is lower than the specified temperature T1, the process proceeds to step S6.

At step S4, controller 30 restricts or inhibits power regeneration by motor generator MG2. At step S5, in order to generate braking force corresponding to that of engine brake, controller 30 starts operation of hydraulic brake device 40 and, thereafter, the control is returned to the main routine at step S7.

At step S6, motor generator MG2 regenerates power and braking force and, thereafter, the control is returned to the main routine at step S7.

Figure 4:
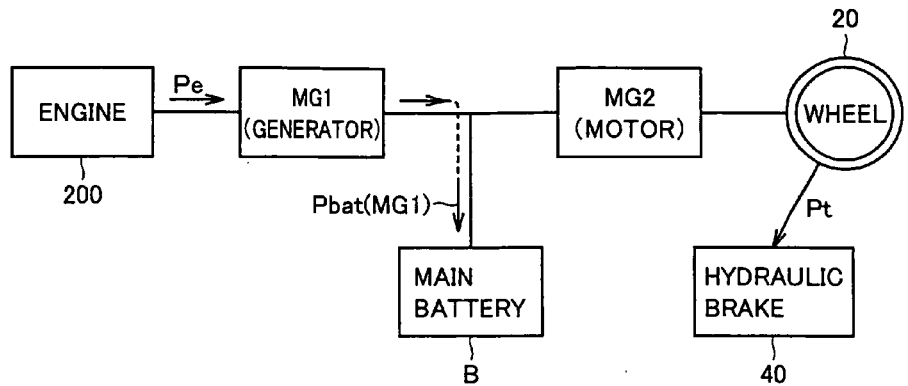
FIG. 4 is a schematic illustration showing the energy flow at the time of running at steps S4 and S5 of FIG. 3.

FIG. 4 is a schematic illustration showing the energy flow at the time of running at steps S4 and S5 of FIG. 3.

Figure 5:
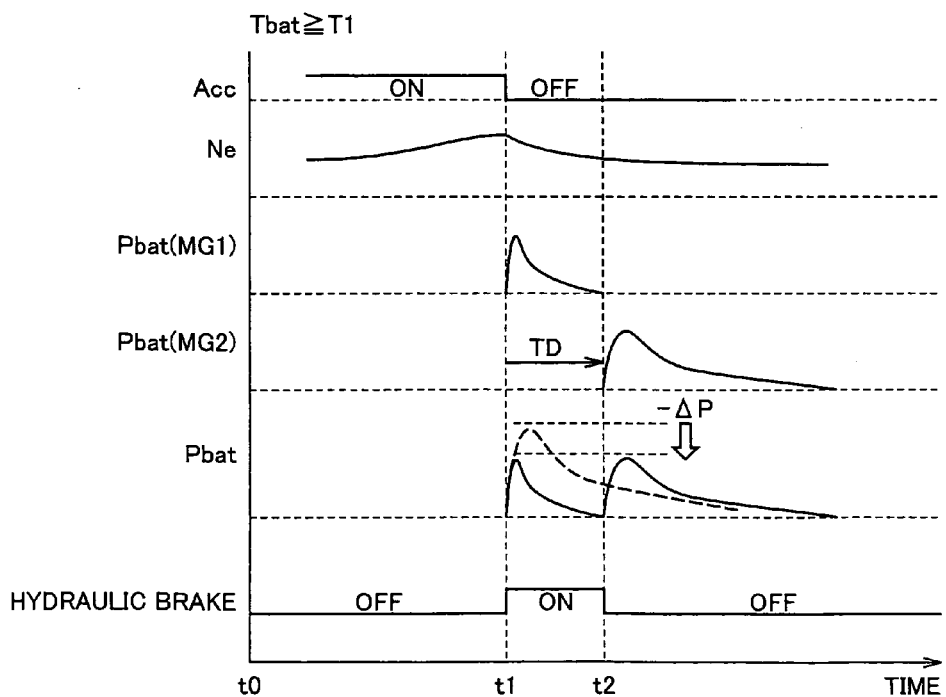
FIG. 5 is a diagram of waveforms illustrating time-change of energy shown in FIG. 4.

FIG. 5 is a diagram of waveforms illustrating time-change of energy shown in FIG. 4.

Referring to FIGS. 4 and 5, if the process proceeds to step S4 of FIG. 3, it means that the driver has released the accelerator pedal or his/her foot is fully away from the pedal and battery temperature Tbat is equal to or higher than the specified temperature T1.

Immediately after the time t1, engine rotation is not yet reduced, the rotational kinetic energy Pe obtained by fuel combustion of engine 200 rotates motor generator MG1, and motor generator MG1 as a generator is continuously outputting electric power Pmg1.

Control response of motor generator MG2 is faster than control response of engine 200 and, therefore, if the accelerator pedal is released and the vehicle enters the accelerator-off state, it becomes unnecessary for motor generator MG2 to generate torque to be applied to the wheels and, therefore it stops power consumption.

Then, surplus generated power, represented as Pbat (MG1), comes to charge battery B. At this time, the hydraulic brake is operated for a prescribed time period from time t1 to t2. In this period, rotational kinetic energy Pt of the wheels is consumed as the friction heat between the disk wheel and the brake pad of the hydraulic brake. Thereafter, the operation of hydraulic brake is stopped, and the operation is switched to regenerative braking.

Specifically, start of regenerative braking using motor generator MG2 is delayed until time t2, at which the engine speed has decreased to some extent and surplus power Pbat (MG1) has reduced.

In other words, if the battery temperature is higher than the specified value, the hydraulic brake is operated at first in response to the release of accelerator pedal, and after a delay TD, regenerative braking by MG2 starts.

By controlling cooperation of the hydraulic brake and regenerative brake in this manner, speed reducing effect corresponding to that of engine brake can be attained and, the operational feeling of the hybrid vehicle comes closer to that of a gas-powered vehicle.

Further, as the peak of electric power charging the battery from motor generator MG1 is shifted from the peak of regenerated power from motor generator MG2, the heat generated in the battery can be reduced by a quantity corresponding to −ΔP.

If the battery temperature is not so high, it may be possible to increase the amount of recovered power.

Figure 6:
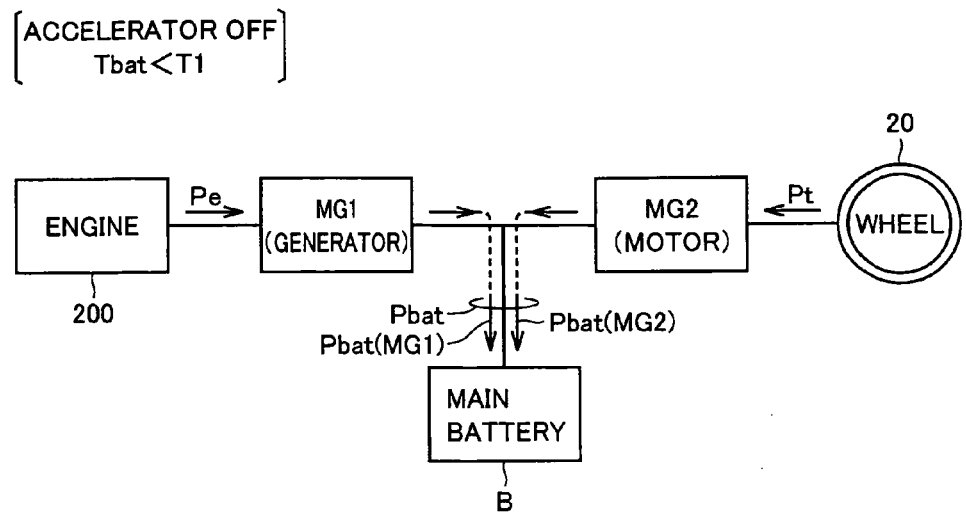
FIG. 6 is a schematic illustration showing the energy flow at the time of running at step S6 of FIG. 3.

FIG. 6 is a schematic illustration showing the energy flow at the time of running at step S6 of FIG. 3.

Figure 7:
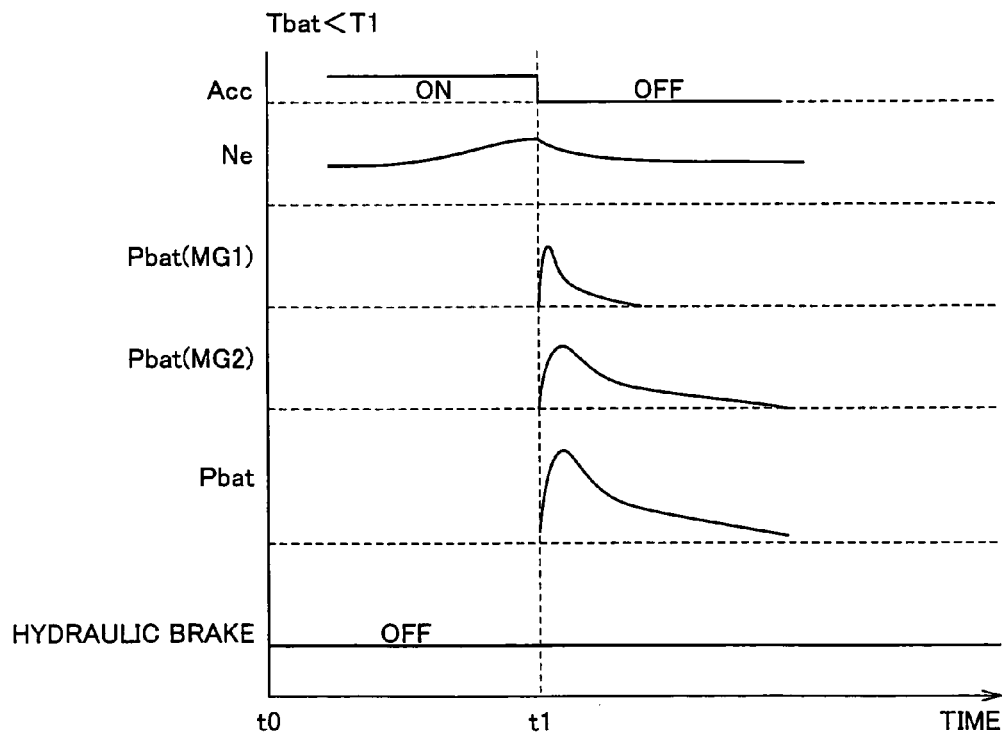
FIG. 7 is a diagram of waveforms illustrating time-change of energy shown in FIG. 6.

FIG. 7 is a diagram of waveforms illustrating time-change of energy shown in FIG. 6.

Referring to FIGS. 6 and 7, if the process proceeds to step S6 of FIG. 3, it means that the driver has released the accelerator pedal or his/her foot is off from the pedal and the battery temperature Tbat is lower than the specified value T1.

Immediately after time t1, engine rotation is not yet reduced, the rotational kinetic energy Pe obtained by fuel combustion of engine 200 rotates motor generator MG1, and motor generator MG1 as a generator is continuously outputting electric power Pmg1.

Control response of motor generator MG2 is faster than control response of engine 200 and, therefore, if the vehicle enters the accelerator-off state, it becomes unnecessary for motor generator MG2 to generate torque to be applied to the wheels, so that it stops power consumption.

Then, surplus generated power, represented as Pbat (MG1), comes to charge battery B. If the battery temperature Tbat has not reached the specified value, it is possible to immediately start regenerative braking of motor generator MG2 without operating the hydraulic brake, to charge battery B additionally with Pbat (MG2). In this case, the energy Pt consumed as heat in frictional brake can be recovered to battery B, and energy efficiency can be improved.

It is not the case that lower temperature is always good for the battery. Specifically, there is an optimal temperature for use. Therefore, there is also an expected effect that the battery can be heated quickly to the optimal temperature range by positively heating the battery during regenerative braking immediately after starting operation at, for example, a very low temperature.

The contents described above will be summarized in the following, again referring to FIG. 1.

The vehicle drive device includes engine 200, motor generator MG1 driven by engine 200 and generating electric power, motor generator MG2 driving the vehicle and generating electric power at the time of regenerative braking, battery B capable of exchanging electric power to/from motor generators MG1 and MG2, temperature sensor 10 detecting the temperature of battery B, and controller 30 controlling motor generators MG1 and MG2. When it is detected that required driving torque value of motor generator MG2 is reduced, controller 30 switches whether motor generator MG2 is to perform regenerative braking, dependent on the output of temperature sensor 10.

If the temperature of battery B exceeds the prescribed value T1, controller 30 monitors the output of accelerator sensor, and inhibits regenerative braking of motor generator MG2 for a prescribed time period (t1 to t2 of FIG. 5) after the reduction in required value is detected.

If the temperature of battery B is below the prescribed temperature, controller 30 allows regenerative braking of motor generator MG2 in a prescribed period (the period of FIG. 7 corresponding to t1 to t2 of FIG. 5) after the reduction in required value is detected.

The vehicle drive device further includes a brake device applying braking force to the vehicle. The brake device includes hydraulic brake device, brake caliper 44 and brake disk 42. When the temperature of battery B exceeds the prescribed value T1, controller 30 inhibits regenerative braking of motor generator MG2 for a prescribed time period (t1 to t2 of FIG. 5) and, in this period, causes the brake device to apply the braking force to the vehicle.

The present embodiment may be described, in a different expression, as follows. The vehicle drive device includes engine 200, motor generator MG1 driven by engine 200 and generating electric power, motor generator MG2 driving the vehicle and generating electric power at the time of regenerative braking, battery B capable of exchanging power to/from motor generators MG1 and MG2, temperature sensor 10 detecting the temperature of battery B, and controller 30 controlling motor generators MG1 and MG2. When it is detected that required driving torque value of motor generator MG2 is reduced, controller 30 changes the timing at which motor generator MG2 starts regenerative braking, dependent on the output of temperature sensor 10.

The vehicle drive device further includes a brake device for applying braking force to the vehicle. The brake device includes hydraulic brake device, brake caliper 44 and brake disk 42. When the temperature of battery B exceeds the prescribed value, controller 30 delays the timing of starting regenerative braking by motor generator MG2 by a prescribed period and, in the period, causes the brake device to apply the braking force to the vehicle.

According to the present embodiment, battery temperature can be maintained in a suitable range at higher ratio and, therefore, battery life is maintained and energy efficiency can be improved.

In the present embodiment, the invention applied to a series/parallel type hybrid system has been described, in which the engine power can be split and transmitted to the axle and the generator. The present invention, however, is also applicable to a series type hybrid vehicle in which only the engine is used for driving the generator and the driving force for the axle is generated only by the motor that consumes the power generated by the generator, or to an electronic vehicle that runs only by the motor. Application of the present invention to these structures is possible, because these structures each have the axle connected to the motor or generator, and at the time of speed reduction, capable of returning and storing regenerative energy to a battery.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A vehicle drive device, comprising:
a first rotating electric machine driving the vehicle and generating electric power at the time of regenerative braking;
an internal combustion engine;
a second rotating electric machine driven by said internal combustion engine and generating electric power;
an electric storage capable of exchanging electric power to/from said first and second rotating electric machines;
a temperature detecting unit detecting temperature of said electric storage; and
a controller controlling said first rotating electric machine; wherein
if reduction in required driving torque value of said first rotating electric machine is detected while said second rotating electric machine is generating electric power, said controller inhibits regenerative braking by said first rotating electric machine dependent on an output of said temperature detecting unit, to allow charging of said electric storage from said second rotating electric machine.

2. A vehicle drive device, comprising:
a first rotating electric machine driving the vehicle and generating electric power at the time of regenerative braking;
an electric storage capable of exchanging electric power to/from said first rotating electric machine;
a temperature detecting unit detecting temperature of said electric storage; and
a controller controlling said first rotating electric machine; wherein
if reduction in required driving torque value of said first rotating electric machine is detected, said controller switches whether regenerative braking by said first rotating electric machine is to be performed or not, dependent on an output of said temperature detecting unit; and if the temperature of said electric storage exceeds a prescribed value, said controller inhibits regenerative braking by said first rotating electric machine in a prescribed time period after detection of reduction in said required value.

3. A vehicle drive device, comprising:
a first rotating electric machine driving the vehicle and generating electric power at the time of regenerative braking;
an electric storage capable of exchanging electric power to/from said first rotating electric machine;
a temperature detecting unit detecting temperature of said electric storage; and
a controller controlling said first rotating electric machine; wherein
if reduction in required driving torque value of said first rotating electric machine is detected, said controller switches whether regenerative braking by said first rotating electric machine is to be performed or not, dependent on an output of said temperature detecting unit; and
if the temperature of said electric storage is below a prescribed value, said controller permits regenerative braking by said first rotating electric machine in a prescribed time period after detection of reduction in said required value.

4. A vehicle drive device, comprising:
a first rotating electric machine driving the vehicle and generating electric power at the time of regenerative braking;
an electric storage capable of exchanging electric power to/from said first rotating electric machine;
a temperature detecting unit detecting temperature of said electric storage; and
a controller controlling said first rotating electric machine; wherein
if reduction in required driving torque value of said first rotating electric machine is detected, said controller switches whether regenerative braking by said first rotating electric machine is to be performed or not, dependent on an output of said temperature detecting unit; and
the vehicle drive device further comprising
a brake device applying braking force to the vehicle; wherein
if the temperature of said electric storage unit-exceeds a prescribed value, said controller inhibits regenerative braking by said first rotating electric machine for a prescribed time period, and braking force is applied to said vehicle by said brake device in said prescribed time period.

* * * * *